(12) United States Patent
Henry

(10) Patent No.: US 11,185,020 B2
(45) Date of Patent: Nov. 30, 2021

(54) HAND TOOL FOR CROPPING PLANTS AND METHODS OF USING THE SAME

(71) Applicants: Brian Henry, Clackamas, OR (US); Marie Henry, Clackamas, OR (US)

(72) Inventor: Brian Henry, Clackamas, OR (US)

(*) Notice: Subject to any disclaimer, the term of this patent is extended or adjusted under 35 U.S.C. 154(b) by 1017 days.

(21) Appl. No.: 15/425,940

(22) Filed: Feb. 6, 2017

(65) Prior Publication Data

US 2018/0220587 A1    Aug. 9, 2018

(51) Int. Cl.
    *A01G 22/00*      (2018.01)
    *A01G 3/00*      (2006.01)
    *A01G 7/00*      (2006.01)

(52) U.S. Cl.
    CPC .............. *A01G 22/00* (2018.02); *A01G 3/00* (2013.01); *A01G 7/00* (2013.01)

(58) Field of Classification Search
    CPC ...... A01G 3/00; A01G 3/08; A01G 2003/005; A01G 23/093; A01G 3/04; A01G 5/00; A01G 3/02; A01G 3/081; A01G 17/023; A01G 17/026; A01G 2005/005; A01G 2/35; A01D 46/24; B26B 13/00; B26B 17/00
    USPC ........................ 47/1.43, 58.1 R, 8, 58.1 FV
See application file for complete search history.

(56) References Cited

U.S. PATENT DOCUMENTS

| | | | |
|---|---|---|---|
| 2,674,796 A * | 4/1954 | Herold | H02G 1/1214 30/122 |
| 5,134,803 A * | 8/1992 | Takasuka | A01G 7/00 256/20 |
| 5,398,415 A * | 3/1995 | Collins, Jr. | B26B 13/22 30/124 |
| 2005/0268467 A1* | 12/2005 | Woods-Hunter | A01G 3/02 30/90.4 |

* cited by examiner

*Primary Examiner* — Peter M Poon
*Assistant Examiner* — Jeffrey R Larsen
(74) *Attorney, Agent, or Firm* — Klarquist Sparkman, LLP

(57) ABSTRACT

A hand cropping tool includes arm members that have handle portions and jaw portions. The jaw portions include curved surfaces that are at least partially covered by deformable materials. The hand cropping tool is configured to be moved from an open configuration in which the first and second jaw members are spaced apart from one another and a closed configuration in which at least a portion of the first jaw member is in contact with at least a portion of the second jaw member. In the closed configuration, the first and second deformable materials collectively define at least one first plant-receiving area.

20 Claims, 4 Drawing Sheets

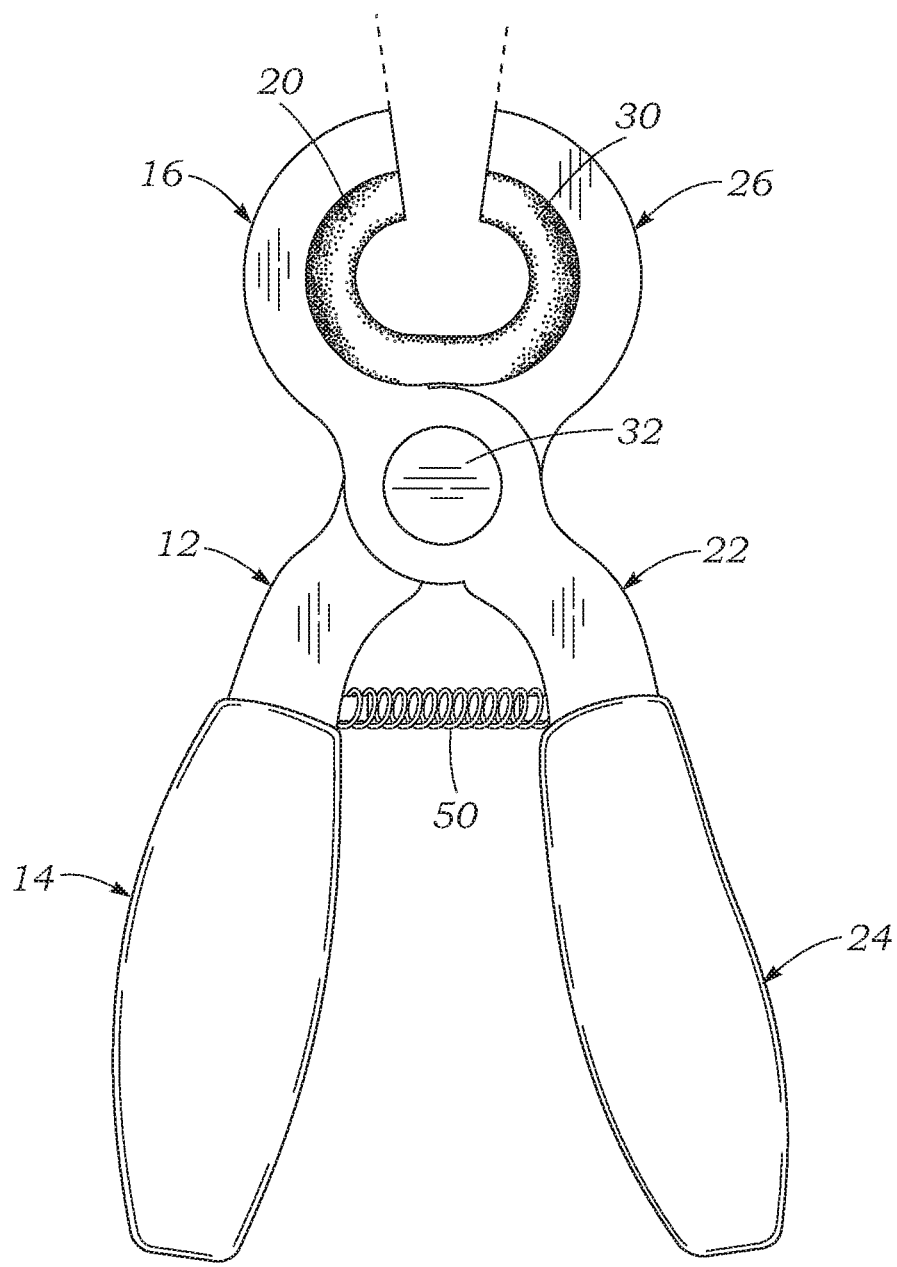

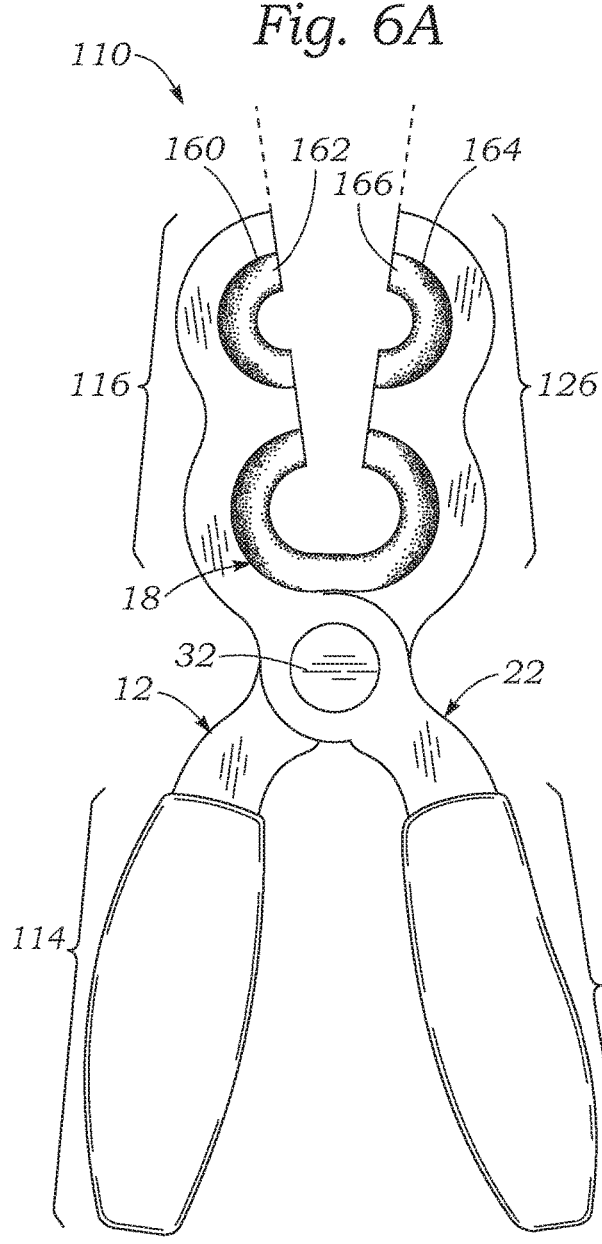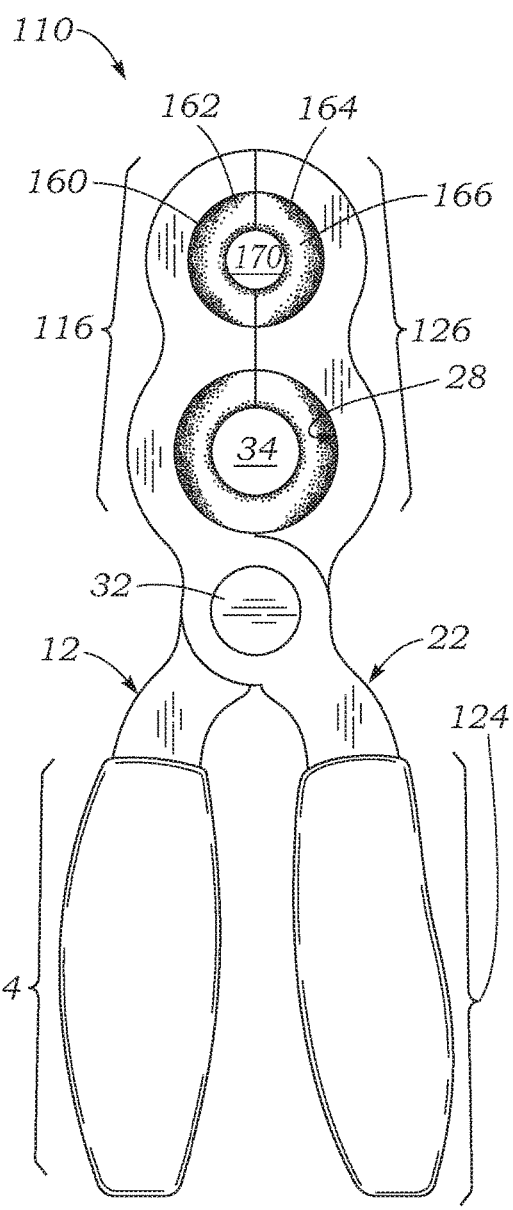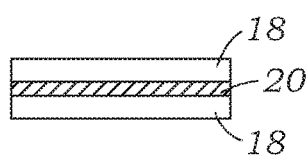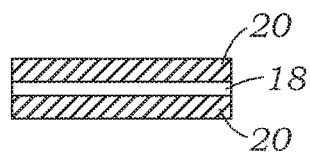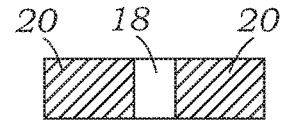

HAND TOOL FOR CROPPING PLANTS AND METHODS OF USING THE SAME

FIELD

This application is directed to methods and systems for modifying plant growth in a controlled manner.

BACKGROUND

With some plant species it is desirable to control the vertical growth of the plant to discourage apical dominance and to encourage the greater growth from the rest of the plant. To achieve this transfer of growth from the top of the plant to other portions of the plant, conventional approaches require physically cutting off the top of the plant (often referred to as "topping") or manually pinching the branch between ones fingers (often referred to as "pinching"). However, both approaches have significant disadvantages and improvements to these approaches are desirable.

SUMMARY

Disclosed herein are various embodiments of hand cropping tools and methods of using the same. These tools are configured to receive a plant stem and apply a circumferential pressure to the plant stem to modify the growth of the plant in a controlled manner.

In one embodiment, the hand cropping tool comprises a first arm member that includes a first handle portion and a first jaw portion, and a second arm member comprising a second handle portion and a second jaw portion. The first jaw portion includes a first curved surface that is at least partially covered by a first deformable material and the second jaw portion comprising a second curved surface that is at least partially covered by a second deformable material. A coupling member engages with the first arm member and the second arm member, and secures them together in a manner that permits relative movement of the first and second arm members. The hand cropping tool is configured to be moved from an open configuration in which the first and second jaw members are spaced apart from one another and a closed configuration in which at least a portion of the first jaw member is in contact with at least a portion of the second jaw member. In the closed configuration, the first and second deformable materials collectively define a first plant-receiving area.

In some embodiments, the plant-receiving area is circular and/or the tool includes a biasing member coupled to the first and second arm members to bias the hand tool in the open configuration. The deformable materials on the different jaw portions can be the same or different. The deformable materials can cover all or some of the curved surfaces.

In certain embodiments, the deformable materials can have a durometer of less than 70, less than 50, or between 20-50 on the ASTM D2240 type A scale.

In another embodiment, the hand cropping tool can include a plurality of plant-receiving areas. For example, one tool can include a third curved surface on the first jaw portion and a fourth curved surface on the second jaw portion.

The foregoing and other objects, features, and advantages of the invention will become more apparent from the following detailed description, which proceeds with reference to the accompanying figures.

BRIEF DESCRIPTION OF THE DRAWINGS

FIG. 5 illustrates another exemplary hand cropping tool.

FIG. 6A illustrates another exemplary hand cropping tool with a plurality of different sized circumferential pressure applicators, shown in an open configuration.

FIG. 6B illustrates the hand cropping tool of FIG. 6A in a closed configuration.

FIGS. 7A, 7B, and 7C illustrate exemplary configurations of pressure applicator surfaces of the hand cropping tool.

DETAILED DESCRIPTION

Figure 1:
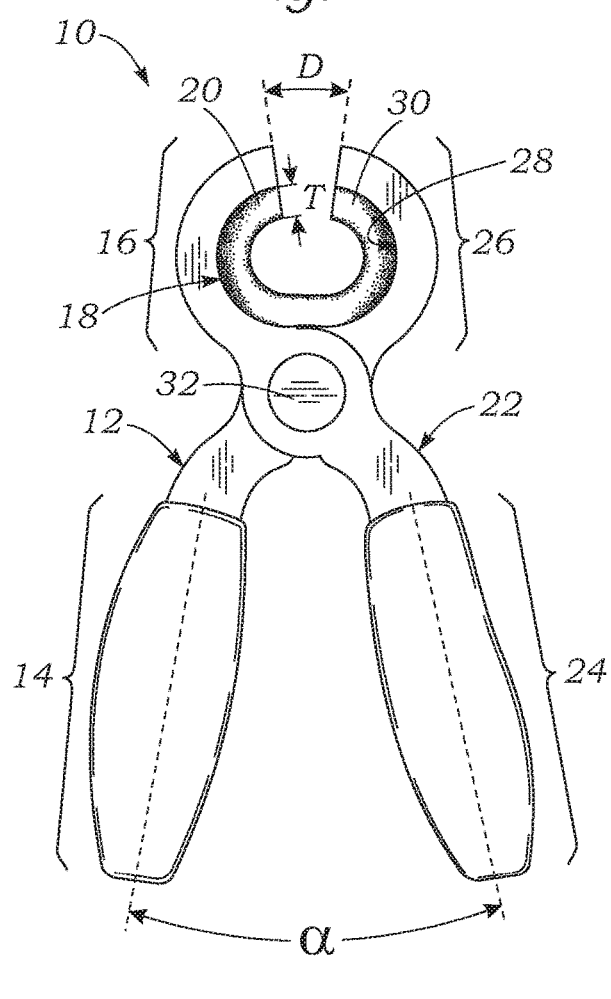
FIG. 1 is a top view of a hand cropping tool in an open configuration.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

As used herein, "stem" means any structural axes of a vascular plant that connects the roots to the leaves and "circumferential" means surrounding a boundary of a curved geometric figure.

Methods and apparatus for applying a controlled amount of circumferential pressure to a portion of a plant (e.g., a stem) are disclosed herein. As disclosed in more detail below, such methods and systems operate by damaging or breaking down a portion of the plant to delaying or decreasing upward growth of the plant. The controlled application of circumferential pressure in the manner described herein can provide various benefits. For example, by applying circumferential pressure to the plant stem, inner portions of the plant a crushed making the stem pliable and easily bent in a desired growth direction. In this manner, upward growth can be restricted and lateral growth encouraged. In addition, by altering the internal structure of the impacted stem area, the manner in which the plant transports nutrients is also affected. This can result in increased flowering of the plant, which may be desirable, as nutrients are redirected from apical growth to other plant processes.

Figure 2:
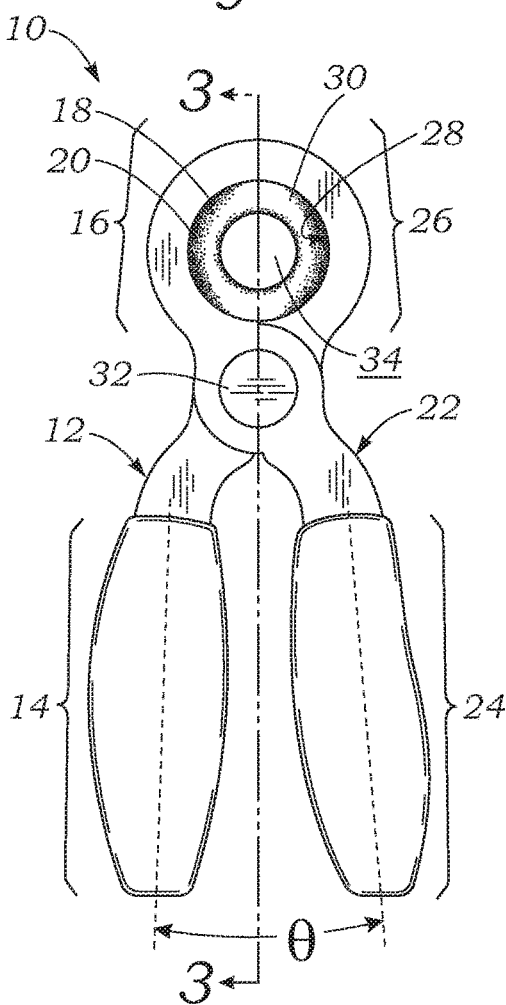
FIG. 2 is a top view of the hand cropping tool of FIG. 1 shown in a closed configuration.

FIGS. 1 and 2 illustrate a hand cropping tool 10 that is moveable between an open configuration (FIG. 1) and a closed configuration (FIG. 2). As described in more detail below, the hand cropping tool can receive a plant stem in the open configuration and apply a circumferential pressure to the exterior surface of the plant stem as the hand cropping tool moves to the closed configuration.

Hand cropping tool 10 includes a first arm member 12 that includes a first handle portion 14 and a first jaw portion 16. First jaw portion 16 has a curved surface 18, which is at least partially covered by a deformable material 20.

Hand cropping tool 10 also includes a second arm member 22 that includes a second handle portion 24 and a second jaw portion 26. Second jaw portion 26 has a second curved surface 28, which is at least partially covered by a deformable material 30.

The first and second arm members 12, 22 are pivotably coupled by a coupling member 32 that secures the two arm members together, while allowing for relative movement between the first and second arm members 12, 22. In the open configuration, the first and second jaw members are spaced apart a distance D (FIG. 1), while in the closed configuration, the first jaw member 16 is in contact with the second jaw member 26.

The space between the first and second deformable materials 18, 28 in the closed configuration define a plant-receiving area 34. The size of the plant-receiving area can vary depending on the particular plants or plant species for which the hand cropping tool is intended to be used. The diameter (or area, if non-circular) of plant-receiving area 34 is preferably smaller than the diameter (or area, if non-circular) of the portion of the plant (e.g., stem) in its natural state. Thus, as the hand cropping tool moves to the closed configuration, the deformable materials come into contact with the exterior surface of the plant stem, thereby applying a circumferential pressure to the plant and causing internal structures of the plant to be crushed or damaged.

In some embodiments, the plant-receiving area 34 has a diameter of less than 10 cm or less than 7 cm. In other embodiments the diameter is less than 5 cm, or, more preferably, between 2 and 5 cm or between 1 and 4 cm.

Figure 3:
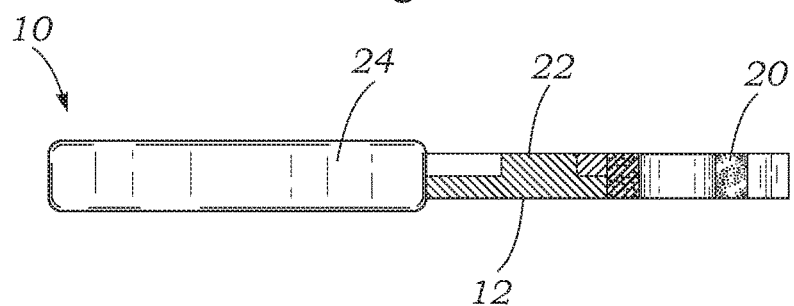
FIG. 3 is a cross-sectional view of the hand cropping tool shown in FIG. 2, taken along line 3-3.

FIG. 3 illustrates a cross-sectional view taken along line 3-3 in FIG. 2. As shown in FIGS. 2 and 3, in this embodiment, deformable materials 20, 30 extend across the entirety of the surfaces of the first and second curved surfaces 18, 28. In addition, in FIGS. 1 and 2 the first and second deformable materials 20, 30 are illustrated as being formed in one piece of the same material. Alternatively, the first and second deformable materials 20, 30 can be separately formed and/or formed of different deformable materials. FIGS. 7A, 7B, and 7C, discussed below, describe some alternative arrangements of the deformable materials.

The deformable materials described herein can comprise a variety of different of materials, such as natural and synthetic rubbers, foams, encapsulated liquids or gels, and silicone materials (e.g., silicone rubber or silicone gels). Preferably, the deformable materials are sufficiently "soft" to reduce harm to the external surface of the plant stem during the application of circumferential pressure by the hand cropping tool, while at the same time being sufficiently firm that they do not compress so easily that, in the closed configuration, insufficient circumferential pressure is applied to the plant stem to achieve the desired internal damage to plant structure.

In some embodiments, the deformable material is selected from materials that have a durometer (hardness) that is less than 70 on the ASTM D2240 type A scale. In other embodiments, the deformable materials have a durometer that is less than 50 on that scale. In still other embodiments the deformable materials have a durometer that between 20-50 on that scale.

The thickness of the deformable material applied to the curved surface of the jaw members can vary depending on the durometer of the material selected. Thus, for example, a lower durometer material, which would experience greater deformation upon application of the circumferential pressure, may require a greater thickness than a material that would not deform as much. In some embodiments, the thickness T of the deformable material can be between 0.5 cm to 5 cm, or more preferably between 0.5 and 2 cm.

Figure 4:
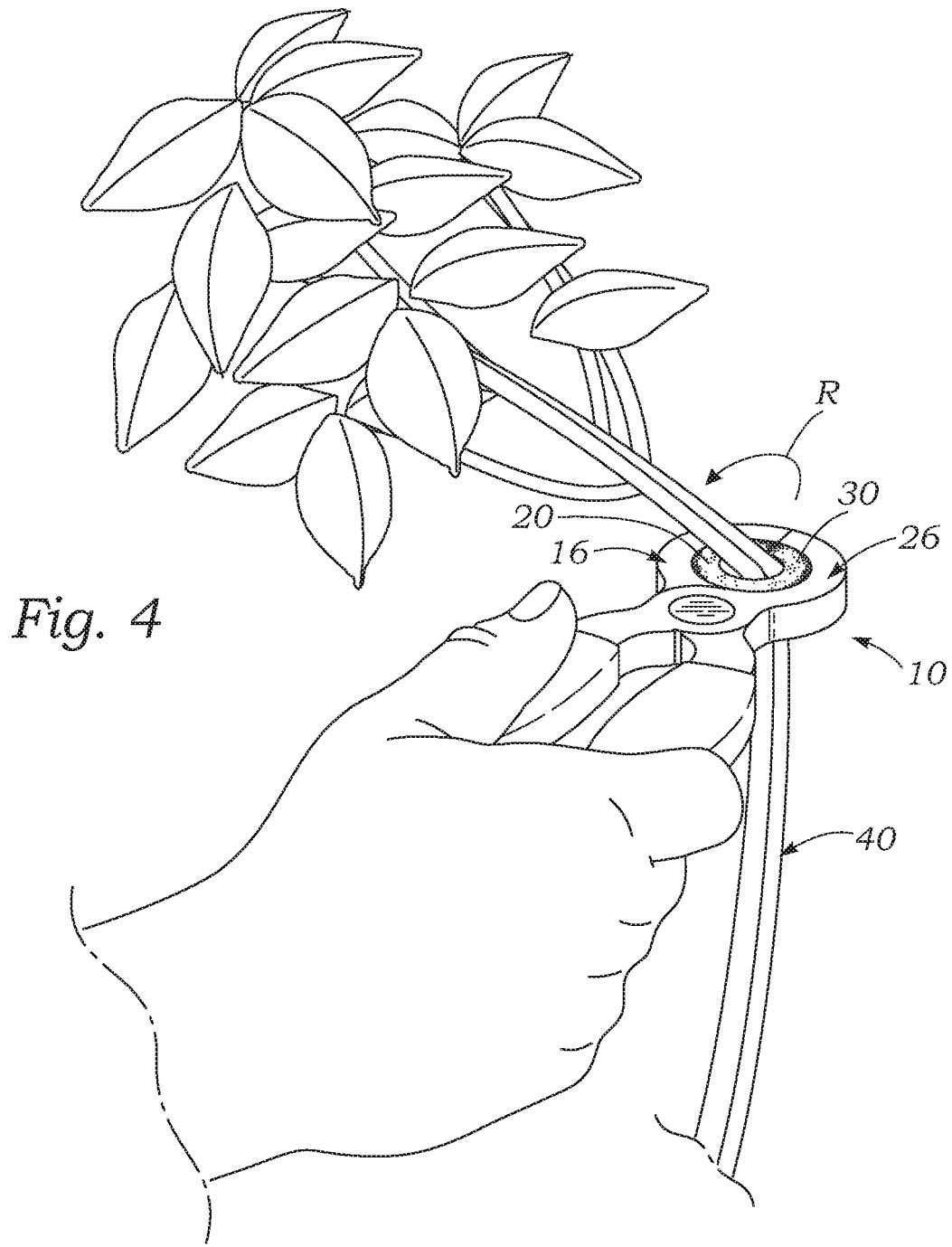
FIG. 4 is a view of the hand cropping tool in operation, shown applying a circumferential pressure on a plant stem.

FIG. 4 illustrates the use of the hand cropping tool 10 on a plant stem 40. As shown in FIG. 4, as the user moves the handle portions towards one another, the jaw portions 16, 26 move to the closed configuration and the deformable material 20, 30 applies a circumferential pressure on the stem 40, causing internal damage and making the stem more pliable. By rotating the hand cropping tool 10 in the direction R while applying the circumferential pressure to the stem 40, the plant stem can be redirected from a generally vertical or upward orientation to a more horizontal orientation.

Referring to FIG. 5, another embodiment of a hand cropping tool is depicted. The tool is similar to that shown in FIGS. 1-4, but also includes a biasing mechanism 50. Biasing mechanism 50 can comprise, for example, a spring member that applies a force to the arm members 12, 22 to bias the hand cropping tool in the open configuration.

FIGS. 6A and 6B illustrate another embodiment of a hand cropping tool 110. For convenience, reference numbers for similar elements in other embodiments are presented with similar reference numbers. For example, handle portions identified as reference numbers 14, 24 in FIG. 1 are identified as reference numbers 114, 124 in FIG. 6A.

Hand cropping tool 110 differs from hand cropping tool 10 in that it includes an additional circumferential pressure applicator. As shown in FIG. 6A, hand cropping tool 110 includes a first jaw portion 116 includes a third curved surface 160, which is at least partially covered by a deformable material 162. Similarly, second jaw portion 126 has a fourth curved surface 164, which is at least partially covered by a deformable material 166.

As in the other embodiment, the first and second arm members 112, 122 are pivotably coupled by a coupling member 132 that allows the hand tool to move from the open configuration (FIG. 6A) to the closed configuration (FIG. 6B). In the open configuration, the first and second jaw members are spaced apart and in the closed configuration, the first jaw member 116 is in contact with the second jaw member 126.

The space between the first and second deformable materials 118, 128 in the closed configuration define a first plant-receiving area 134 and the space between the third and fourth deformable materials 162, 164 define a second plant-receiving area 170. The sizes of the two plant-receiving areas are different so that the same tool can effectively apply circumferential pressure to different size plant stems. Although the embodiments disclosed herein include one or two different sized plant-receiving areas, it should be understood that more than two plant-receiving areas could be provided by extending the length of the jaw members 116, 126 illustrated in FIGS. 6A and 6B.

FIGS. 7A, 7B, and 7C illustrate three alternative arrangements of deformable materials on the curved surfaces of the hand cropping tools described herein. For example, FIGS. 7A, 7B, and 7C illustrate embodiments where the first deformable material 20 is not coextensive with the first curved surface 20. Rather, only a portion of the first curved surface is covered by the deformable material, such as a central portion of the first curved surface in FIG. 7A and outer portions of the first curved surface in FIG. 7B. Alternatively, the deformable material 20 can be discontinuous around the circumference of the first curved surface 18 as shown in FIG. 7C.

In operation, a method of using the tool can include applying pressure to a plant stem and adjusting the growth of the plant member in a controlled manner by positioning the plant stem between interior surfaces of the first and second jaw member. By applying a force to the hand cropping tool, the first and second jaw members are moved from the open configuration (in which the first and second jaw members are spaced apart from one another) to the closed configuration that defines a plant-receiving area and in which at least a portion of the first jaw member is in contact with at least a portion of the second jaw member. As the jaw members close, the deformable material(s) contact an exterior surface of the plant stem, thereby applying a circumferential pressure to the exterior surface of the plant. This circumferential pressure applies a steady and distributed force to the exterior (circumferential) surface of the plant stem, causing it to a least partially crush between a lower portion of the plant stem and an upper portion of the plant stem. Once the plant stem is partially crushed, its position (and as a result, its growth trajectory) can be adjusted from a first orientation to a second orientation. As discussed above, the original growth trajectory is usually a vertical trajectory, causing apical growth of the plant. The resulting trajectory of the second orientation can be less vertical, thereby causing the plant to grow outwardly in a more "bushy" manner. In some embodiments, the preferred orientation of the second orientation is horizontal or substantially horizontal (e.g., ±20 degrees from horizontal).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A hand cropping tool for modifying plant growth in a controlled manner, comprising:
   a first arm member comprising a first handle portion and a first jaw portion, the first jaw portion comprising a first curved surface, the first curved surface being at least partially covered by a first deformable material;
   a second arm member comprising a second handle portion and a second jaw portion, the second jaw portion comprising a second curved surface, the second curved surface being at least partially covered by a second deformable material; and
   a coupling member that engages with the first arm member and the second arm member, the coupling member securing the first and second arm members together in a manner that permits relative movement of the first and second arm members,
   wherein the hand cropping tool can be moved from an open configuration in which the first and second jaw portions are spaced apart from one another and a closed configuration in which at least a portion of the first jaw portion is in contact with at least a portion of the second jaw portion, and
   wherein, in the closed configuration, the first and second deformable materials collectively define a first plant-receiving area.

2. The hand cropping tool of claim 1, wherein the plant-receiving area is circular.

3. The hand cropping tool of claim 1, further comprising a biasing member coupled to both the first and second arm members, the biasing member being configured to bias the hand tool in the open configuration.

4. The hand cropping tool of claim 1, wherein the first deformable material is the same material as the second deformable material.

5. The hand cropping tool of claim 1, wherein the first deformable material covers an entirety of the first curved surface and the second deformable material covers an entirety of the second curved surface.

6. The hand cropping tool of claim 1, wherein the first and second deformable materials have a durometer of less than 70 on the ASTM D2240 type A scale.

7. The hand cropping tool of claim 1, wherein the first and second deformable materials have a durometer of less than 50 on the ASTM D2240 type A scale.

8. The hand cropping tool of claim 1, wherein the first and second deformable materials have a durometer of between 20-50 on the ASTM D2240 type A scale.

9. The hand cropping tool of claim 1, further comprising:
   a third curved surface on the first jaw portion, the third curved surface being at least partially covered by a third deformable material; and
   a fourth curved surface on the second jaw portion, the fourth curved surface being at least partially covered by a fourth deformable material,
   wherein, in the closed configuration, the third and fourth deformable materials collectively define a second plant-receiving area, the second plant-receiving area a size that is different than the first plant-receiving area.

10. The hand cropping tool of claim 1, wherein the plant-receiving area has a diameter of less than 10 cm.

11. A method of applying pressure to a stem of a plant and adjusting the growth of the plant in a controlled manner, the method comprising:
   positioning a plant stem between an interior surface of a first jaw member of a hand cropping tool and an interior surface of a second jaw member of the hand cropping tool, the interior surfaces being curved and at least partially covered by a deformable material;
   applying a force to the hand cropping tool to move the first and second jaw members of the hand cropping tool from an open configuration in which the first and second jaw members are spaced apart from one another into a closed configuration that defines a plant-receiving area and in which at least a portion of the first jaw member is in contact with at least a portion of the second jaw member, wherein in the closed configuration, the deformable material contacts an exterior surface of the plant stem and applies a circumferential pressure to the exterior surface to at least partially crush the plant stem between a lower portion of the plant stem and an upper portion of the plant stem; and adjusting the upper portion of the plant stem from a vertical orientation to a horizontal orientation.

12. The method of claim 11, wherein the second orientation is a horizontal orientation.

13. The method of claim 11, wherein, in the closed configuration, the plant-receiving area of the hand cropping tool is circular.

14. The method of claim 11, wherein the hand cropping tool comprises a biasing member that biases the first and second jaw members in the open configuration, wherein the application of force to the hand cropping tool comprises a force sufficient to overcome the biasing member and move the first and second jaw members into the closed configuration.

15. The method of claim 11, wherein the plant-receiving area has a diameter of less than 10 cm.

16. The method of claim 11, wherein the plant-receiving area has a diameter of less than 5 cm.

17. The method of claim 11, wherein the plant-receiving area has a diameter of between 1 and 4 cm.

18. The method of claim 11, wherein the deformable material has a durometer of less than 70 on the ASTM D2240 type A scale.

19. The method of claim 11, wherein the deformable material has a durometer of less than 50 on the ASTM D2240 type A scale.

20. The method of claim 11, wherein the deformable material has a durometer of between 20-50 on the ASTM D2240 type A scale.

* * * * *